United States Patent
Herloski et al.

(10) Patent No.: US 8,233,021 B2
(45) Date of Patent: Jul. 31, 2012

(54) SYSTEMS AND METHODS FOR CONTROLLING POLYGON INDUCED BANDING

(75) Inventors: Robert Herloski, Webster, NY (US); Martin Pepe, West Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 358 days.

(21) Appl. No.: 12/716,447

(22) Filed: Mar. 3, 2010

(65) Prior Publication Data
US 2011/0216377 A1 Sep. 8, 2011

(51) Int. Cl.
*B41J 15/14* (2006.01)
*B41J 27/00* (2006.01)
(52) U.S. Cl. .......................... 347/243; 347/259; 347/261
(58) Field of Classification Search .................. 347/229, 347/234, 239, 240, 243, 248, 251–255, 259–261
See application file for complete search history.

(56) References Cited

U.S. PATENT DOCUMENTS

| | | | |
|---|---|---|---|
| 4,989,019 A * | 1/1991 | Loce et al. | 347/234 |
| 5,900,901 A * | 5/1999 | Costanza et al. | 347/248 |
| 7,253,386 B2 | 8/2007 | Ernst | |
| 7,492,381 B2 * | 2/2009 | Mizes et al. | 347/129 |
| 7,564,475 B1 | 7/2009 | Mizes | |
| 2002/0159791 A1 * | 10/2002 | Chen et al. | 399/167 |
| 2008/0117280 A1 | 5/2008 | Pepe | |
| 2008/0117281 A1 | 5/2008 | Pepe | |

OTHER PUBLICATIONS

U.S. Appl. No. 12/194,824, filed Aug. 20, 2008, Pepe.

* cited by examiner

*Primary Examiner* — Hai C Pham
(74) *Attorney, Agent, or Firm* — Luis M. Ortiz; Kermit D. Lopez; Ortiz & Lopez, PLLC

(57) ABSTRACT

Systems and methods for reducing the degradation of image quality due to banding in an image processing system by detection of both integrated intensity and peak intensity of a laser beam reflected from the polygon mirror facet(s) of a motor polygon assembly. A banding detector is adapted to enable measurement of peak intensity and integrated intensity of the laser beam(s) reflected from the polygon mirror facet(s). Polygon facet induced banding can be determined from the measurements and can be used for sorting/manufacturing raster output scanners and/or compensating for the induced banding.

20 Claims, 5 Drawing Sheets

SYSTEMS AND METHODS FOR CONTROLLING POLYGON INDUCED BANDING

TECHNICAL FIELD

The disclosed embodiments relate to methods and systems for image data processing. Embodiments also relate to laser scanning for image data processing. Embodiments are additionally related to scan detectors for raster output scanners.

BACKGROUND

Image data processing systems commonly employ raster output scanners (ROS) as the source of signals to be imaged on a pre-charged photoreceptor for purposes of xerographic printing. A raster output scanner includes one or more sources of a plurality of laser beams, a spinning polygon having reflecting facets for sweeping the laser beams to form a scan line path, and a photoreceptor for receiving illumination from multiple laser beams and converting them into corresponding electrical charges. Defects in the raster output scanner construction can affect resulting print image quality.

There is a general need for systems and methods that can provide improved laser scanning for image data processing systems. The methods and systems of the illustrative embodiments help meet this need.

SUMMARY

The following summary of the invention is provided to facilitate an understanding of some of the technical features related to techniques, apparatuses, and methods for reducing image quality defects in raster output scanners and is not intended to be a full description. A full appreciation of the various aspects of the invention can be gained by taking the entire specification, claims, drawings, and abstract as a whole. This description is meant to be exemplary.

The aforementioned aspects of the invention and other objectives and advantages can now be achieved as described herein.

According to one aspect, there is provided a system for reducing the degradation of image quality due to banding in an image processing system. The system can comprise a motor polygon assembly and one or more laser beams for illuminating the facet(s) of a polygon mirror of the motor polygon assembly. A banding detector is adapted to enable measurement of peak intensity and integrated intensity of the laser beam(s) reflected from the facet(s).

According to another aspect, there is provided a method for reducing the degradation of image quality due to banding in an image processing system. The method can comprise: generating one or more laser beams; providing a motor polygon assembly with a polygon mirror having one or more facets for sweeping the laser beam(s); rotating the polygon mirror; reflecting the laser beam(s) from the polygon facet(s); and detecting peak intensity and integrated intensity of the reflected laser beam(s).

According to yet another aspect there is provided a raster output scanner. The raster output scanner can comprise: one or more laser beams; a data source and laser driver for generating the laser beam(s); a scan detection circuit operably connected to the laser driver for producing a start of scan signal; a motor polygon assembly comprising a rotatable polygon mirror and a motor for rotating the polygon mirror; the polygon mirror having one or more facets for reflecting the laser beam(s) illuminating the polygon; a photoreceptor receiving illumination from the laser beam(s) reflected from the facet(s); and a banding detector adapted to enable the measurement of peak intensity and integrated intensity of the laser beam(s) reflected from the facet(s).

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment of the present invention and are not intended to limit the scope of the invention.

Technical features described in this application can be used to construct various systems and methods for adjusting laser beam power in a scanner as a countermeasure for banding induced by a spinning polygon of an image processing system. The systems and methods of the illustrative embodiments provide compensation based on the peak power of the scan beam. These systems and methods enable peak power compensation for correcting laser beam variations induced by scanner polygon facet flatness variation as well as facet reflectance variations.

Figure 1:
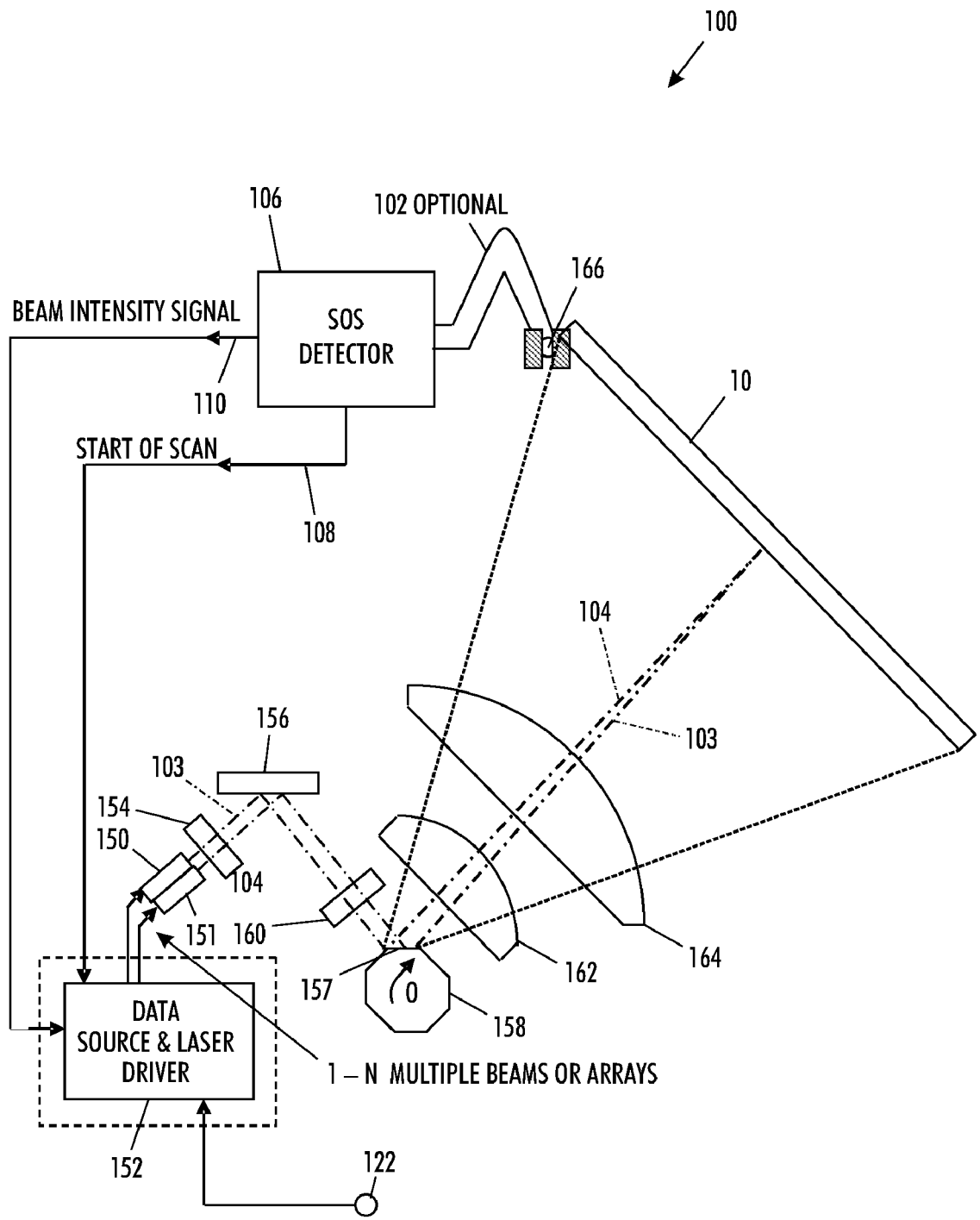
FIG. 1 illustrates a block diagram of a plan view of an exemplary raster output scanner for the purpose of explaining the invention.

For the purpose of understanding the systems and methods of the embodiments described hereinafter, reference will initially be made to an exemplary raster output scanner utilized in an electro photographic printing machine. A plan view of such a raster output scanner employing motor polygon assembly (MPA) facet mapping is illustrated in FIG. 1. The raster output scanning assembly 100 can include a plurality of laser diodes or array(s) 150 and 151 which produce laser beams 103 and 104, respectively, and which are modulated according to image data from the data source and laser driver 152. The image data from the data source and laser driver 152 might originate from an input scanner, a computer, a facsimile machine, a memory device, or any of a number of other image data sources.

The purpose of the data source and laser driver 152 is to excite lasers 150 and 151 with modulated drive currents such that the desired electrostatic latent image is interlaced on the photoreceptor in precise registration with uniform exposure. The output flux from laser diodes 150 and 151 are collimated by optical elements 154, reflected by fold mirror 156, and focused on reflective facets 157 of a rotating polygon 158 by cylindrical lens 160. The facets of rotating polygon 158 deflect the beams which are then focused into well defined spots focused on the surface of photoreceptor 10 by scan lens elements 162 and 164. As the polygon rotates, the focused spots trace parallel raster scan lines on the surface of the photoreceptor. A SOS detector 106 is positioned in the scan path to collect light flux from beams 103 and 104 at the beginning of the scan. Optionally, the input end of the optical fiber 102 is positioned in the scan path to collect light flux from beams 103 and 104 at the beginning of the scan. In FIG. 1, the optical fiber 102 transmits the intercepted flux to the SOS detector 106. The beam intensity signal 110 and the start of scan signals are configured from the SOS detector 106 to the data source and laser driver 152. The synchronized input 122 is an input to the data source and laser driver 152.

It has been determined that a ROS induces a periodic image quality defect called banding at the ROS polygon once around frequency, which the current analysis indicates is primarily due to ROS spot defocus caused by polygon facet flatness variations. Other contributors include facet to facet reflectivity variation and wobble. Heretheto now, an approach to meet a print engine image quality specification has been to sort the ROS output via print testing to identify the ROSs with the lowest banding defect. This approach adds considerable cost to the ROS due to the resources required to support the print testing process.

In a xerographic system, banding sensitivity appears to be maximized when the separately imaged halftone dots grow in size and just start to "touch". For a discharged-area-development system, this corresponds to an "n bit off" video profile, where n is close to 1 or 2. The exposure profile equals the convolution of the ROS static spot with the video profile. When the minimum of the exposure profile approaches the "xerographic development threshold", system sensitivity to minor variations in xerographics, exposure, etc., is maximized.

It has been identified that the effect on the ROS spot of small variations in polygon facet flatness is primarily to redistribute energy in the tails of the profile, and, by conservation of energy, to reduce the peak value of the profile. As will be explained in more detail below, the systems and methods of the illustrative embodiments measure the peak intensity value of the ROS spot and uses this information to measure, and potentially compensate for, polygon facet flatness-induced banding.

Figure 2:
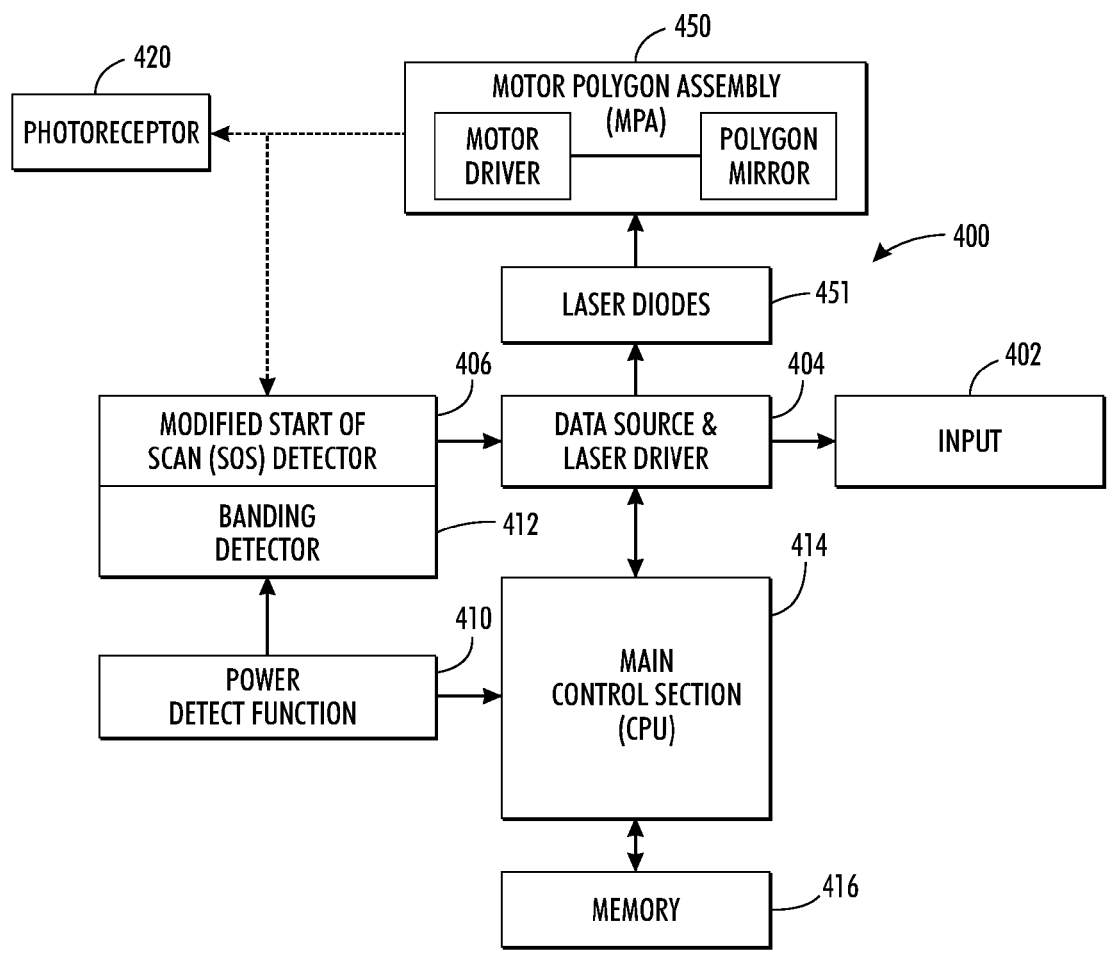
FIG. 2 illustrates a block diagram of a system for use in reducing the degradation of image quality due to banding in an image processing system, according to one embodiment.

Referring now to FIG. 2, a block diagram is illustrated of an exemplary raster output scanner system 400 for a xerographic system, in accordance with one embodiment. The input interface 402 for data processing can be setup with the data source and laser driver 404. A laser beam generator is configured to generate one or more laser beams which are passed to a motor polygon assembly 450 for deflecting the beams on to the surface of a photoreceptor 420. In the example of FIG. 2, a laser beam generator includes laser driver 404 and laser diodes 451. The laser beam reflected off the polygon facets can hit the SOS detector directly or indirectly, for example, by funneling the beam via a lightpipe arrangement to the SOS detector. Light flux from the scan beams is collected and sent to the start of scan (SOS) detector 406 wherein it can be configured to the data source and laser driver 404. Light flux from the scan beams is also output to the photoreceptor 420. The whole functionality of the system can be set up with a controller, which in the example of FIG. 2 is computer processor unit (CPU) 414, and attached to a memory unit 416. Controllers other than CPUs are envisaged. Controller 414 can be mainly configured with the laser beam generator (data source and laser driver 404 and laser diodes 451). The start of scan (SOS) detector 406 can be enabled with a power detect function, if required.

The laser spot size will change slightly as a result of polygon facet errors such as, for example, the facet is not perfectly flat, but has a slight curvature. It has been identified that whilst the integrated intensity of the laser spot does not change, the spot size does. As will be explained in more detail below, the laser spot peak intensity is representative of peak shape information and not just laser power. The peak intensity value of the ROS spot measured using the banding detector 412 is, in fact, strongly correlated to the banding signature. This peak value information can be used to measure, and compensate for, polygon mirror flatness-induced banding and other induced banding.

In the illustrative embodiment of FIG. 2, banding detector 412 is integrated in the start of scan (SOS) detector 406 and is configured to measure the peak value of the beam as it scans across the detector. This can be achieved, for example, by including an aperture in front of the detector for enabling the detector to measure the peak intensity of the laser beam spot falling on it. The aperture can be a pinhole or a narrow slit. Any type of banding detector can be employed that is capable of detecting the peak intensity and integrated intensity of the laser beam spot. For example, the banding detector 412 can comprise an integrated pattern detector or any other type of photo-detector suitable for detecting peak intensity of the laser beam spot. Banding detector 412 can also be an individual detector separate from the start of scan (SOS) detector 406, or can be integrated in an EOS detector rather than the start of scan detector. Furthermore, a controller can be integrated in the banding detector 412 and used to determine the induced banding instead of the main controller 414.

The detected peak and integrated intensities can be fedback into the system to determine the polygon mirror flatness-induced banding and, if necessary, control the power of the generated laser beam to compensate for the induced banding. In the system of FIG. 2, the controller 414 can determine the polygon mirror flatness-induced banding based on the peak and integrated intensities detected by the banding detector and, in response, control the laser beam generator to change the average power of the generated laser beams to compensate for the measured banding. The laser beam power can be changed, for example, by changing the amplitude and/or the timing of the laser beam.

Figure 3:
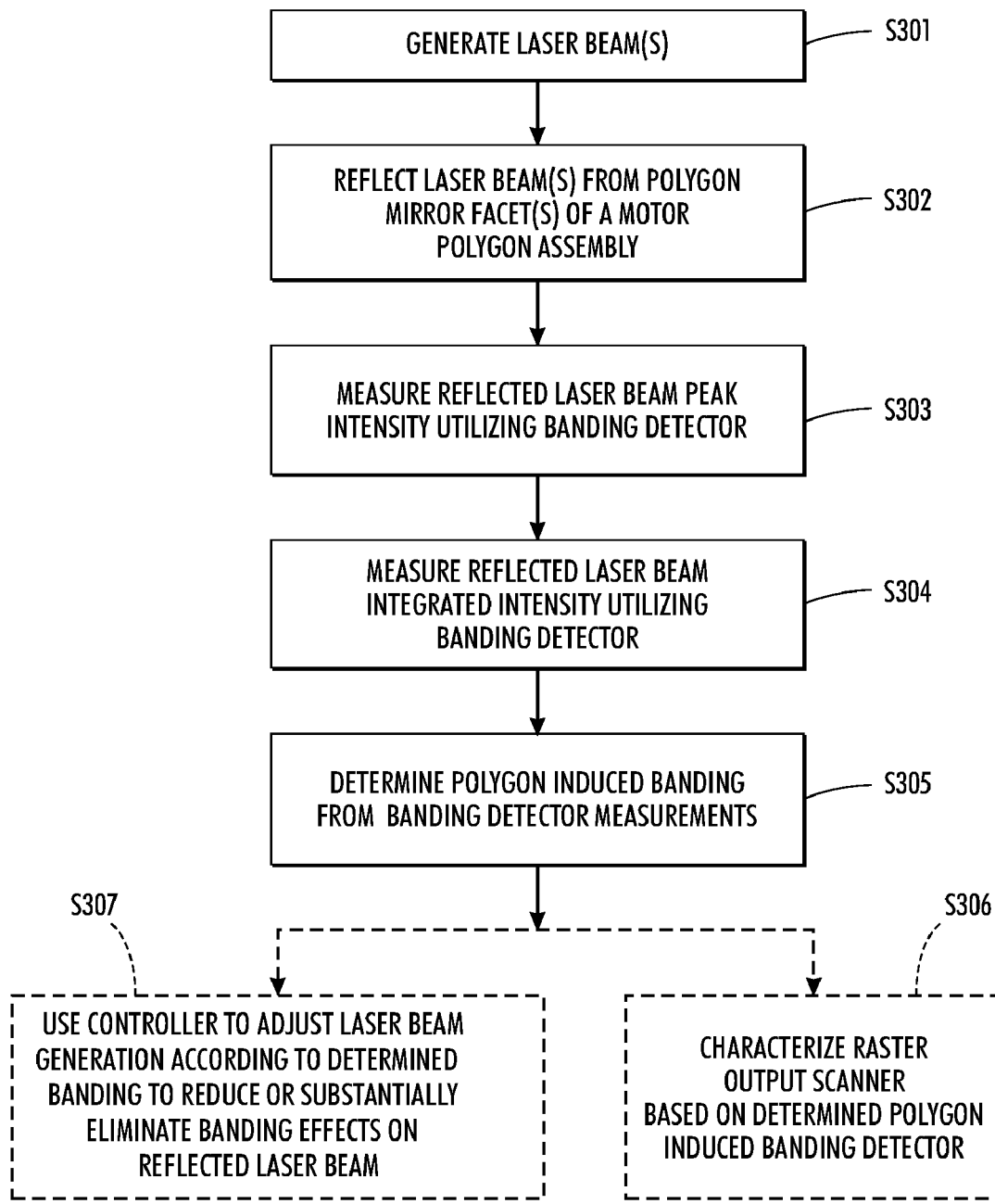
FIG. 3 illustrates a flow chart outlining a method for use in reducing the degradation of image quality due to banding in an image processing system, according to one embodiment.

Referring to FIG. 3, which illustrates a flow chart outlining a method for controlling image quality banding in an image processing system, according to one embodiment. As indicated in FIG. 3, one or more laser beams are generated (S301). The one or more laser beams are reflected from the facet(s) of the motor polygon assembly (S302). Thereafter, the peak intensity of the reflected laser beam(s) is measured utilizing the banding detector (S303). The integrated intensity of the reflected laser beam(s) is also measured utilizing the banding detector (S304). The process of S304 can be implemented before S303, if need be. The polygon facet induced banding can be determined from the banding detector measurements (S305).

Various processes can be implemented based on the determined induced banding. For example, the raster output scanner can be characterized for sorting/manufacturing based on the determined induced banding (see optional process S306). In another example, a controller can be used to adjust the generation of the laser beam according to the determined polygon facet induced banding to reduce or substantially eliminate banding effects on reflected laser beam(s) (see optional process S307).

It can be shown that the value of the minimum of the exposure profile in the n bit off case is directly related to the peak value of the ROS spot profile, and hence, changes in the peak value of the ROS spot profile detected will contribute to changes in that minimum value. For small variations in polygon facet flatness, the effect on the ROS spot is primarily to redistribute energy in the tails, and, by conservation of energy, reduce the peak value of the profile. Facet reflectivity variations affect both peak and integrated intensities. Measuring both intensities will measure both defocus-induced and reflectivity-induced intensity variations. Resulting system banding is a combination of the individual components, taking into account phase. With the measured peak intensity information, one can compensate for the variation, and reduce or eliminate banding.

EXAMPLE

Figure 4:
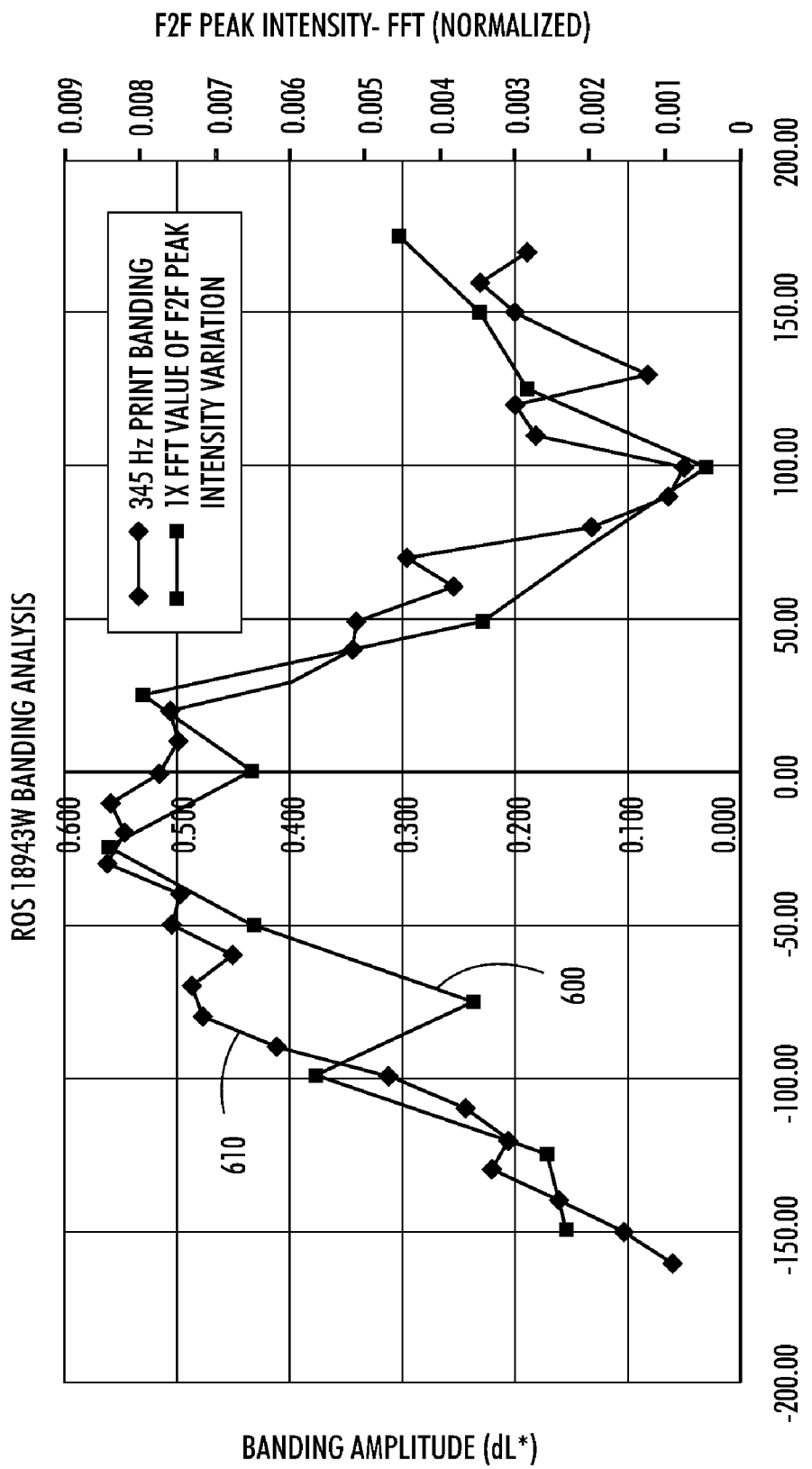
FIG. 4 illustrates an exemplary graph of banding amplitude versus cross process location of measured exemplary printing banding, superimposed with an exemplary graph of the "peak intensity metric" versus cross process location.

Reference will now be made to an example to demonstrate how peak intensity measured by a banding detector does correlate with system banding. FIG. 4 is a graph showing a plot 610 vs. cross process location of measured 345 Hz print banding of a ROS, Serial number 18943W, that exhibits particularly excessive banding. Also given in the graph is a plot 600 vs. cross process location of the normalized 1×FFT of the facet to facet variation of peak intensity, as measured by a CCD camera serving as a banding detector located at the image plane of the ROS. Note the excellent correlation between the 1×FFT and the print banding.

Correlation between peak intensity and banding can be shown mathematically as follows:

$$I(x) = S(x) * V(x)$$

if $$V(x) = rect\left(\frac{x}{w}\right) = V_{on}(x)$$

$$I_{on}(x) = S(x) * rect\left(\frac{x}{w}\right)$$

if $$V(x) = \left[1 - rect\left(\frac{x}{w}\right)\right] = V_{off}(x)$$

$$I_{off}(x) = S(x) * V_{off}(x) = S(x) * \left[1 - rect\left(\frac{x}{w}\right)\right] = K - I_{on}(x);$$

$$K = \int_{-\infty}^{\infty} S(x)\,dx$$

$$I_{on,max} = \int_{-W/2}^{W/2} S(x)\,dx = 2\int_{0}^{W/2} S(x)\,dx$$

if $$S(-x) = S(x)$$

$$I_{off,min} = K - 2\int_{0}^{W/2} S(x)\,dx = 2\int_{W/2}^{\infty} S(x)\,dx \quad \text{(``tails'' behavior)}$$

$$S_1(x) = S_{01} \cdot \overline{S}_1(x) \quad \int_{-\infty}^{\infty} S_1(x)\,dx = \int_{-\infty}^{\infty} S_2(x)\,dx$$

$$S_2(x) = S_{02} \cdot \overline{S}_2(x) \quad \therefore \int_{0}^{\infty} S_{01} \cdot \overline{S}_1(x) = \int_{0}^{\infty} S_{02} \cdot \overline{S}_2(x)$$

$$I_{off 1,2} = k - 2\int_{0}^{W/2} S_{1,2}(x)\,dx = 2\int_{W/2}^{\infty} S_{1,2}(x)\,dx$$

$$I_{off 1} - I_{off 2} = \left[k - 2\int_{0}^{W/2} S_{1,2}(x)\,dx\right] - \left[k - 2\int_{0}^{W/2} S_2(x)\,dx\right]$$

$$= 2\left[\int_{0}^{W/2} S_2(x)\,dx - \int_{0}^{W/2} S_1(x)\,dx\right]$$

$$= 2\left[\int_{W/2}^{\infty} S_1(x)\,dx - \int_{W/2}^{\infty} S_2(x)\,dx\right]$$

("difference" in tails behavior)

if $$S_2(x) = S_{02}\overline{S}_2(x)$$

$$S_1(x) = S_{01}\overline{S}_1(x)$$

$$\Delta I = 2\left[\int_{0}^{W/2} S_2(x) - \int_{0}^{W/2} S_1(x)\right] =$$

$$= 2\left[S_{02}\int_{0}^{W/2} \overline{S}_2(x) - S_{01}\int_{0}^{W/2} \overline{S}_1(x)\right]$$

$$\Delta I \approx 2 \cdot \int_{0}^{W/2} \overline{S}_{12}(x)[S_{02} - S_{01}]$$

With reference to the above mathematical concept:

S(x) is the ROS static spot profile in the cross process direction;

V(x) is the input video for the cross process direction; and

I(x) is the convolved irradiance (or intensity) distribution or dynamic irradiance profile.

The "rect" function denotes an idealized square wave input video of width "w"; e.g., "n"-bit on video, where n could be, for example, 1 or 2, or another integer. Let n=1 for future discussion.

The [1-rect] function denotes, for example, 1-bit off video. $I_{on(x)}$ is the dynamic irradiance distribution for 1 bit on video. $I_{off(x)}$ is the dynamic irradiance distribution for 1 bit off video. $I_{on,max}$ is the peak irradiance value of the 1 bit on video. $I_{off,min}$ is the minimum irradiance value of the 1 bit off video. Note that if "w" is large enough, $I_{off,min}=0$.

Sn(x)=S0n(x)*Snbar(x): Sn is the ROS static spot profile for, say, facet #n. S0n is the peak value of the corresponding ROS static spot profile, and Snbar is the normalized ROS static spot profile (peak value=1). $I_{off1}-I_{off2}$ is the difference in the minimum intensity values of I for two difference facets.

If $\overline{S_1}(x)$ and $\overline{S_{22}}(x)$ are approximately the same over range±w/2, then:

A) Energy is just being distributed "in the tails"; and

B) The energy redistribution is reflected in the peak values of the functions.

It is much easier to measure $(S_{02}-S_{01})$ then the difference of the integrated energy in the tails.

Figure 5A:
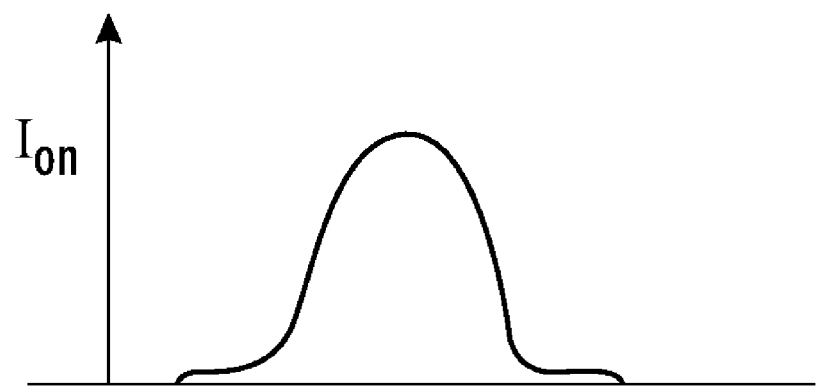
FIGS. 5A and 5B illustrate graphs of theoretical intensity profiles of a laser.
Figure 5B:
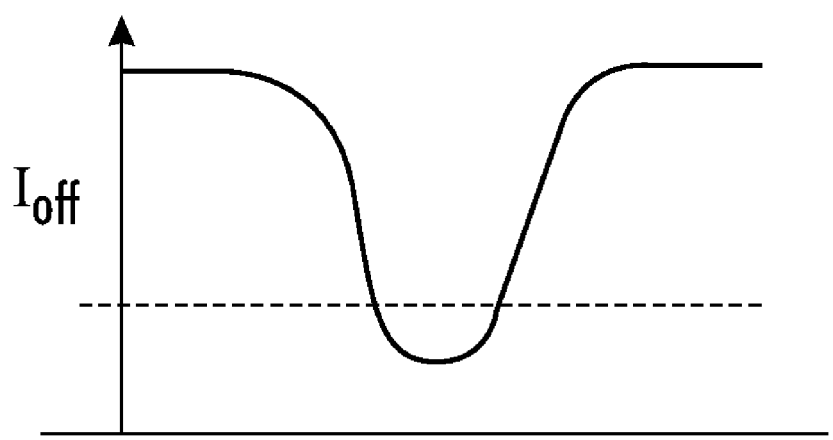

Graphical representations of $I_{on}$ and $I_{off}$ are illustrated in FIGS. 5A and 5B, respectively. $I_{on}$ represents the intensity distribution produced by a raster output scanner in response to a 1-bit on video input. $I_{off}$ represents the intensity distribution produced by a raster output scanner in response to a 1-bit off video input. The dotted line in the $I_{off}$ plot schematically represents the approximate, idealized "xerographic threshold" in a xerographic system, approximately where the transition from a toned to non-toned image occurs.

The systems and methods of the illustrative embodiments enable a relatively simple in-situ measurement of a critical parameter related to banding, which can be used to characterize ROSs for banding for sorting/manufacturing purposes, or can be used in a compensation strategy.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as possibly amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A system for controlling image quality banding in an image processing system, the system comprising:
   a motor polygon assembly for an image processing system, said assembly comprising a rotatable polygon mirror and a motor for rotating said polygon mirror, said polygon mirror having at least one facet for reflecting at least one laser beam illuminating said polygon;
   at least one laser beam for illuminating on said facet(s); and
   a banding detector adapted to enable measurement of peak intensity and integrated intensity of said laser beam(s) reflected from said facet(s).

2. The system of claim 1, further comprising
   a controller operably coupled to said banding detector, said controller being adapted to determine polygon facet induced banding from said measurement of peak intensity and integrated intensity.

3. The system of claim 2, wherein said controller is further configured to adjust at least one laser beam according to said measurements such that polygon facet banding effects in the reflected laser beam(s) are reduced or substantially eliminated.

4. The system of claim 2, wherein said controller is adapted to adjust the amplitude and/or timing of said laser beam(s) according to said measurements.

5. The system of claim 2, wherein said polygon facet induced banding comprises polygon facet flatness induced banding.

6. The system of claim 1, wherein said banding detector comprises a modified SOS or EOS detector of a Raster Output Scanner.

7. The system of claim 1 wherein said banding detector comprises an integrated patterned detector.

8. A method for controlling image quality banding in an image processing system, the method comprising:
   generating at least one laser beam;
   providing a motor polygon assembly with a polygon mirror having at least one facet for sweeping said laser beam(s);
   rotating said polygon mirror;
   reflecting said laser beam(s) from said polygon facet(s); and
   detecting peak intensity and integrated intensity of said reflected laser beam(s).

9. The method of claim 8, further comprising:
   determining polygon facet induced banding from said measurement of peak intensity and integrated intensity.

10. The method of claim 9, further comprising sorting/manufacturing a raster output scanner based on said determined induced banding.

11. The method of claim 9, further comprising:
    adjusting said laser beam(s) according to said measurement to reduce or substantially eliminate polygon facet induced banding effects on said reflected laser beam(s).

12. The method of claim 11, wherein adjusting said laser beam comprises adjusting the average power of said laser beam(s).

13. The method of claim 12, wherein adjusting the average power of said laser beam(s) comprises adjusting the amplitude and/or timing of said laser beam(s).

14. The method of claim 8, wherein detecting said peak intensity and integrated intensity of said reflected beam(s) comprises detecting said peak intensity and integrated intensity utilizing a modified start of scan (SOS) detector or end of scan (EOS) detector of an image processing system.

15. A raster output scanner comprising:
    at least one laser beam;
    a data source and laser driver for generating said at least one laser beam;
    a scan detection circuit operably connected to said laser driver for producing a start of scan signal;
    a motor polygon assembly comprising a rotatable polygon mirror and a motor for rotating said polygon mirror, said polygon mirror having at least one facet for reflecting said at least one laser beam illuminating said polygon;
    a banding detector adapted to enable measurement of peak intensity and integrated intensity of said laser beam(s) reflected from said facet(s); and
    a photoreceptor for receiving illumination from said at least one laser beam reflected from said facet(s).

16. The raster output scanner of claim 15, further comprising:
    a controller operably coupled to said banding detector, said controller being adapted to determine polygon facet induced banding from said measurement of peak intensity and integrated intensity.

17. The raster output scanner of claim 16, wherein said controller is further configured to adjust said laser beam(s) according to said measurements such that polygon facet banding effects in the reflected laser beam(s) are reduced or substantially eliminated.

18. The raster output scanner of claim 17, wherein said controller is adapted to adjust the amplitude and/or timing of said laser beam(s) according to said measurements.

19. The raster output scanner of claim 15, wherein said banding detector comprises a modified start of scan (SOS) or modified end of scan (EOS) detector.

20. The raster output scanner of claim 15, wherein said banding detector comprises an integrated detector.

* * * * *